US011606894B2

(12) United States Patent
Unruh

(10) Patent No.: US 11,606,894 B2
(45) Date of Patent: Mar. 21, 2023

(54) IMPLEMENT GUIDANCE MODULE

(71) Applicant: COPPERHEAD PLANTER PRODUCTS, LLC, Humboldt, SD (US)

(72) Inventor: Marlin Unruh, Madrid, NE (US)

(73) Assignee: COPPERHEAD PLANTER PRODUCTS, LLC, Humboldt, SD (US)

( * ) Notice: Subject to any disclaimer, the term of this patent is extended or adjusted under 35 U.S.C. 154(b) by 113 days.

(21) Appl. No.: 16/874,139

(22) Filed: May 14, 2020

(65) Prior Publication Data

US 2020/0375082 A1 Dec. 3, 2020

Related U.S. Application Data

(60) Provisional application No. 62/853,557, filed on May 28, 2019.

(51) Int. Cl.
| | |
|---|---|
| *A01B 69/00* | (2006.01) |
| *A01B 59/042* | (2006.01) |
| *A01B 69/08* | (2006.01) |
| *B60D 1/14* | (2006.01) |
| *B60D 1/36* | (2006.01) |

(52) U.S. Cl.
CPC .......... *A01B 69/004* (2013.01); *A01B 59/042* (2013.01); *A01B 69/006* (2013.01); *A01B 69/007* (2013.01); *B60D 1/141* (2013.01); *B60D 1/36* (2013.01)

(58) Field of Classification Search
CPC ... A01B 69/004; A01B 69/006; A01B 69/007; A01B 59/042; B60D 1/141; B60D 1/36
See application file for complete search history.

(56) References Cited

U.S. PATENT DOCUMENTS

| | | |
|---|---|---|
| 4,133,552 A | 1/1979 | Sheine |
| 4,681,335 A | 7/1987 | Ledermann et al. |
| RE34,080 E | 9/1992 | Schmidt |
| 5,150,849 A | 9/1992 | Farrow et al. |
| 5,240,079 A | 8/1993 | Schmidt |

(Continued)

FOREIGN PATENT DOCUMENTS

| | | |
|---|---|---|
| DE | 3129537 A1 | 2/1983 |
| DE | 3427432 | 2/1986 |

(Continued)

*Primary Examiner* — Tara Mayo-Pinnock
(74) *Attorney, Agent, or Firm* — Greer, Burns & Crain, Ltd

(57) ABSTRACT

An implement guidance module is provided for positioning a drawn implement as the implement is pulled by a vehicle traveling along a desired path of movement, the vehicle having a connection point for receiving a hitch. The module includes a module main frame having a first end configured for connection to the vehicle connection point, and a second end configured for connection to the implement, the main frame having a longitudinal axis, and having a pivot mount connected to the second end with an implement mounting plate pivoting relative to the module main frame about a pivot axis perpendicular to the longitudinal axis. A vehicle mounting plate defines the first end of the module main frame, and the implement mounting plate defines the second end of the module main frame.

16 Claims, 5 Drawing Sheets

(56) References Cited

U.S. PATENT DOCUMENTS

| | | | | |
|---|---|---|---|---|
| 5,335,856 A | * | 8/1994 | Nathan | A01B 59/042 |
| | | | | 172/324 |
| 5,360,070 A | * | 11/1994 | Milton | A01B 59/042 |
| | | | | 172/6 |
| 5,655,581 A | | 8/1997 | Craft | |
| 6,631,916 B1 | | 10/2003 | Miller | |
| 6,865,465 B2 | | 3/2005 | McClure | |
| 7,204,318 B2 | * | 4/2007 | Taylor | A01B 71/066 |
| | | | | 172/450 |
| 8,256,526 B2 | | 9/2012 | Schmidt et al. | |
| 9,873,300 B1 | * | 1/2018 | Gramlow | A01B 69/003 |
| 2003/0085047 A1 | | 5/2003 | Ollefs | |
| 2006/0016611 A1 | | 1/2006 | Chauvel | |
| 2010/0198444 A1 | | 8/2010 | Jensen | |
| 2020/0094636 A1 | * | 3/2020 | Gygi et al. | A01B 63/111 |

FOREIGN PATENT DOCUMENTS

| | | | | |
|---|---|---|---|---|
| FR | 2570244 A1 | | 3/1986 | |
| FR | 2703955 A1 | * | 10/1994 | A01B 59/042 |
| WO | 1988010063 A1 | | 12/1988 | |

* cited by examiner

IMPLEMENT GUIDANCE MODULE

RELATED APPLICATION

The present application is a Non-Provisional of, and claims 35 USC 119 priority from, U.S. Provisional Application Ser. No. 62/853,557 filed May 28, 2019, the contents of which are incorporated by reference herein.

BACKGROUND

The present invention generally relates to guidance control systems for implements that trail a vehicle and for the vehicle that pulls the implements.

In the farming industry, guidance systems for controlling the position of trailing implements have been developed and marketed for many years. The design of some of the types of systems has limited their effectiveness and accuracy with regard to positioning the implement. Guidance systems that have exhibited reliable and accurate operation are those manufactured and marketed by Sunco of North Platte and Madrid, Neb. An exemplary implement guidance system is described in commonly-assigned U.S. Pat. No. 8,256,526 which is incorporated by reference.

While the conventional guidance systems, such as those described above, have been effective, there is a perceived need in the industry for a simplified guidance system which is easily converted to various conventional tractor hitch and implement configurations.

SUMMARY

The above-listed need is met or exceeded by the present implement guidance module, which includes adapters for connection to a variety of implement hitch systems, including but not limited to drawbar hitches and two-point hitches. In the preferred embodiment, the present implement guidance module is mounted between the towing vehicle or tractor and the implement, which is contemplated to include conventional agricultural implements, including but not limited to tillage, planting and harvesting implements. A core of the present implement guidance module is a main frame, mounted at a first end to the vehicle, and at an opposite, second end to the implement. At the second end is a pivot mount and having an implement mounting plate pivoting relative to the mainframe about a preferably vertical pivot axis. Preferably hydraulic, fluid-powered cylinders mounted to the main frame and to the pivot mount control the pivoting action of the pivot mount, and under control of a control system, ultimately help steer or guide the implement.

A vehicle mounting plate defines the first end of the module main frame, and is opposite the implement mounting plate. Included on the present guidance module is a pair of adapters, referred to as a vehicle adapter and an implement adapter. The vehicle adapter is constructed and arranged for accommodating a desired hitch mount configured for connection to the vehicle connection point, and has a vehicle adapter plate configured for mounting to the vehicle mounting plate. Similarly, the implement adapter is constructed and arranged for accommodating a connection to the implement and having an implement adapter plate configured for mounting to the implement mounting plate.

Each of the vehicle and the implement adapter are provided with suitable mounting fittings having apertures for accommodating engagement with conventional mounts on the vehicle and the implement, typically by a vertically inserted mounting pin or the like. More specifically, the vehicle adapter includes a hitch attachment connected to the vehicle adapter plate on a surface of the plate opposite a connection point of the module main frame, the hitch attachment constructed and arranged for accommodating one of a drawbar hitch and a two-point hitch. The implement adapter includes an implement attachment connected to the implement adapter plate on a surface of the plate opposite a connection point of the module main frame, the implement attachment configured for connection to a hitch mount of an implement. When the vehicle hitch is a two-point hitch, the implement attachment defines a vertical pivot axis, and is constructed and arranged for pivotally accommodating a hitch mount of an implement and including stabilizer bars for providing a non-pivoting attachment between the implement hitch mount and the implement adapter plate. When the vehicle hitch is a drawbar hitch, the implement attachment provides a non-pivoting attachment between the implement hitch mount and the implement adapter plate.

Each of the implement adapter plate and the implement mounting plate preferably have two spaced, parallel vertical rows of complementary mounting apertures for facilitating releasable connection of the implement adapter plate to the implement mounting plate. Similarly, each of the vehicle adapter plate and the vehicle mounting plate preferably have two spaced, parallel vertical rows of complementary mounting apertures for facilitating releasable connection of the vehicle adapter plate to the vehicle mounting plate. Another feature of the present implement guidance module is that the module main frame has a periphery, and the vehicle mounting plate and the implement mounting plate each have a peripheral edge extending vertically and horizontally beyond the periphery of the main frame.

A feature of the present implement guidance module is that free pivoting action between the tractor or other towing vehicle and the implement occurs at the point of the vehicle adapter. Pivoting action of the implement relative to the implement adapter is prevented, except for any pivoting motion that is originated through action of the fluid power cylinders acting on the implement adapter plate area under the control of the control system.

More specifically, an implement guidance module is provided for positioning a drawn implement as the implement is pulled by a vehicle traveling along a desired path of movement, the vehicle having a connection point for receiving a hitch. The module includes a module main frame having a first end configured for connection to the vehicle connection point, and a second end configured for connection to the implement, the main frame having a longitudinal axis, and having a pivot mount connected to the second end with an implement mounting plate pivoting relative to the module main frame about a pivot axis perpendicular to the longitudinal axis. A vehicle mounting plate defines the first end of the module main frame, and the implement mounting plate defines the second end of the module main frame.

A vehicle adapter is constructed and arranged for accommodating a desired hitch mount configured for connection to the vehicle connection point, the vehicle adapter having a vehicle adapter plate configured for mounting to the vehicle mounting plate. An implement adapter is constructed and arranged for accommodating a connection to the implement and having an implement adapter plate configured for mounting to the implement mounting plate. In a preferred embodiment, the main frame, the vehicle adapter and the implement adapter are provided together as the present module.

In another embodiment, an implement guidance module is provided for positioning a drawn implement as the implement is pulled by a vehicle traveling along a desired path of movement, the vehicle having a connection point for receiving a hitch. The module includes a module main frame having a first end configured for connection to the vehicle connection point, and a second end configured for connection to the implement, the main frame having a longitudinal axis, and having a pivot mount connected to the second end with an implement mounting plate pivoting relative to the module main frame about a pivot axis perpendicular to the longitudinal axis. A vehicle mounting plate defines the first end of the module main frame and is configured for connection to a vehicle adapter which is connectable to a vehicle hitch. The implement mounting plate defines the second end of the module main frame and is configured for connection to an implement adapter which is connectable to an implement hitch mount.

DETAILED DESCRIPTION

Figure 1:
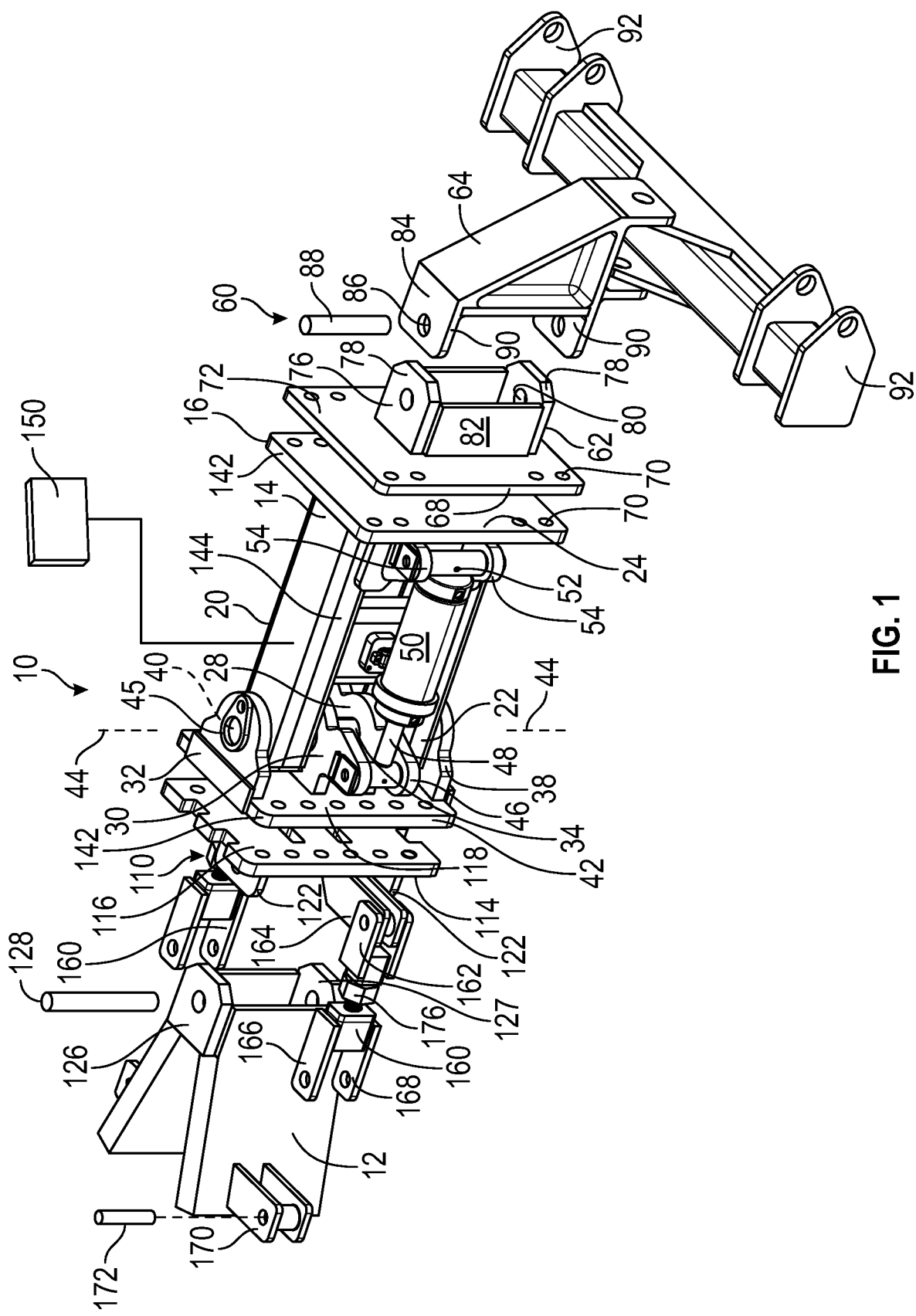
FIG. 1 is a top perspective view of the present implement guidance module configured for mounting to a two-point hitch.

Referring now to FIGS. 1-4, the present implement guidance module is generally designated 10. In use, the module 10 is constructed and arranged for being mounted between a vehicle (not shown), such as a tractor or the like having a hitch, and an implement fragmentarily shown at 12. The module 10 is configured for maintaining alignment of the implement 12 relative to a designated crop row or path of movement, where it is desired that such alignment is maintained independent of the position of the vehicle.

A main component of the module 10 is a main frame, generally designated 14, having a first end 16 configured for connection to the vehicle, and a second, opposite end 18 configured for connection to the implement 12. Included on the main frame 14 is an upper beam 20 and a preferably spaced, parallel lower beam 22. The beams 20, 22 define a longitudinal axis of the main frame 14.

A vehicle mounting plate 24 is secured, as by welding, fasteners or the like to ends 26 of the beams 20 and 22 for structural support at the first end 16. At the opposite, second end 18, a space 28 between the beams 20, 22 is occupied by a weldment 30 of a pivot mount 32, which is also provided with a pivot bore 34. Upper and lower pivot brackets 36, 38 have bracket bores 40 in alignment with the pivot bore 34.

An implement mounting plate 42, like the vehicle mounting plate 24, is generally planar and vertically oriented, is secured to the weldment 30 and to the pivot brackets 36, 38 so that upon installation at the second end 18, the pivot mount 32 pivots relative to the main frame 14 about a pivot axis 44 (FIG. 3), which is preferably defined by a pivot pin 45 inserted through the bores 34, 40. Also, the implement mounting plate 42 defines the second end 18 of the module main frame 14. As seen in FIG. 1, in an aligned position, with a shared longitudinal axis of the implement and the vehicle, when the implement is directly behind the vehicle, the vehicle mounting plate 24 and the implement mounting plate 42 are parallel to each other.

On the weldment 30, at least one and preferably a pair of clevis mounts 46 are each laterally displaced from the pivot axis 44, and define a mounting point for an end 48 of a preferably hydraulic, fluid-powered cylinder 50. An opposite end 52 of the cylinder 50 is mounted to laterally extending fixed, vertically spaced ears 54 of the main frame 14. While, in the preferred embodiment, the first cylinder end 48 is the rod end, and the second cylinder end 52 is the blind end, it is contemplated that the orientation of the cylinder 50 may be reversed, depending on the application.

Figure 2:
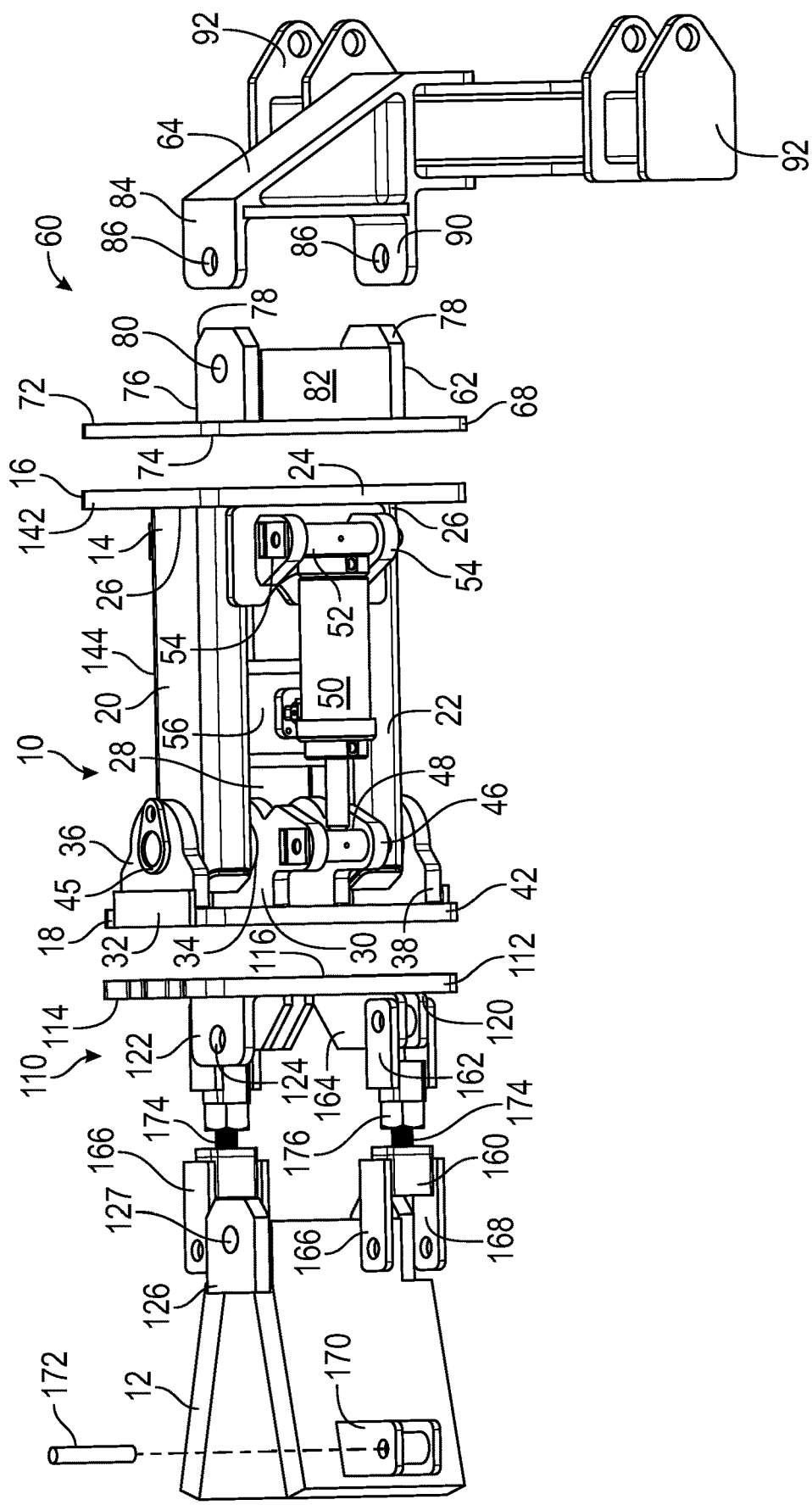
FIG. 2 is a side perspective view of the implement guidance module of FIG. 1.
Figure 3:
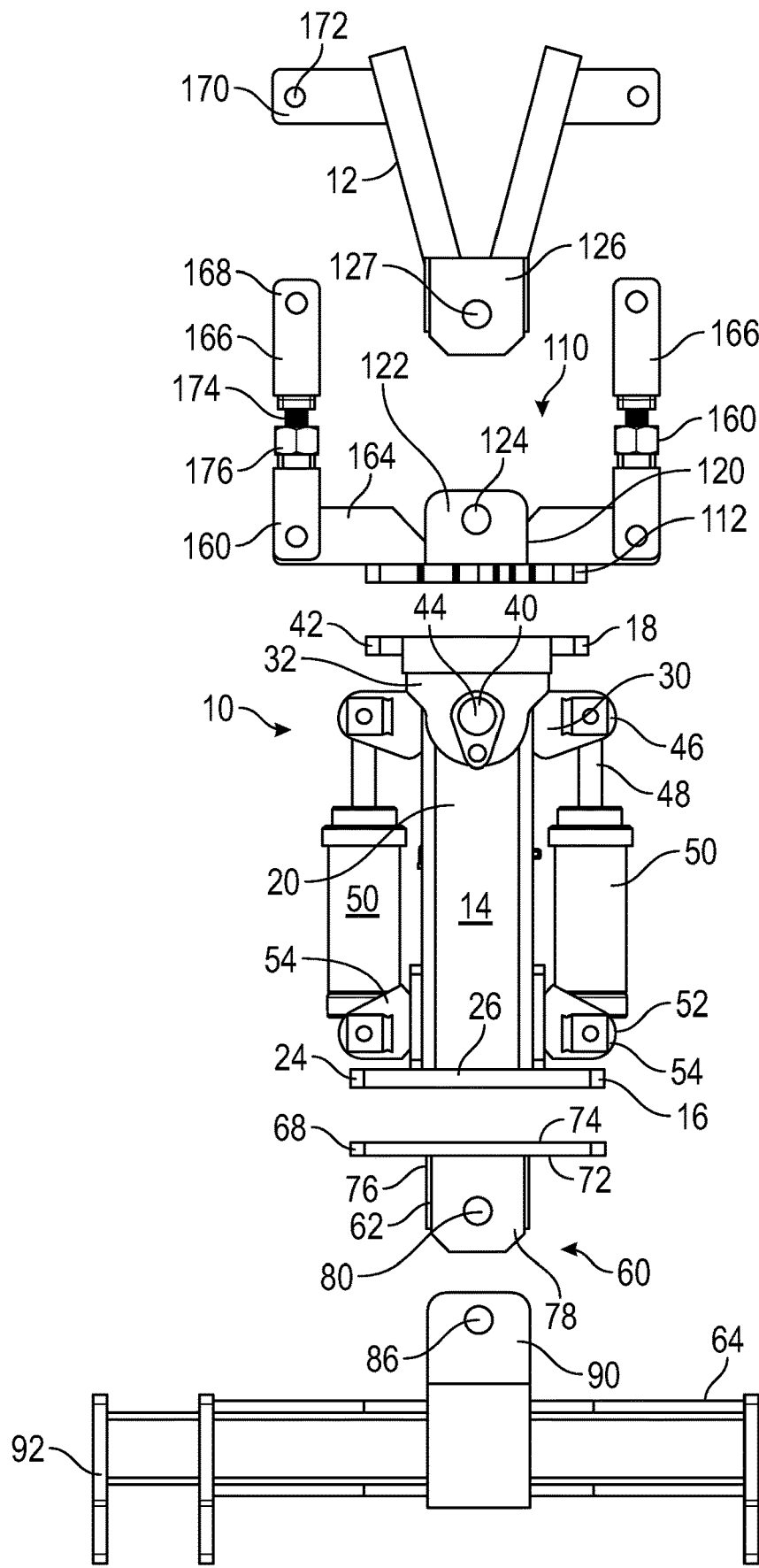
FIG. 3 is a top view of the implement guidance module of FIG. 1.

As seen in FIG. 3, in the preferred embodiment, there are two cylinders 50, one associated with each side of the main frame 14. Selective reciprocal extension or retraction of each of the cylinders 50 causes pivoting of the implement mounting plate 42 about the pivot axis 44 relative to the module main frame 14. Also, with two such cylinders 50, for added power applied to the implement mounting plate 42, as one cylinder extends, the other retracts. Additional structural support between the upper and lower beams 20, 22 is provided by a vertically projecting member 56 (FIG. 2) which is preferably fixed, as by welding, fasteners or the like, to the respective beams.

Figure 4:
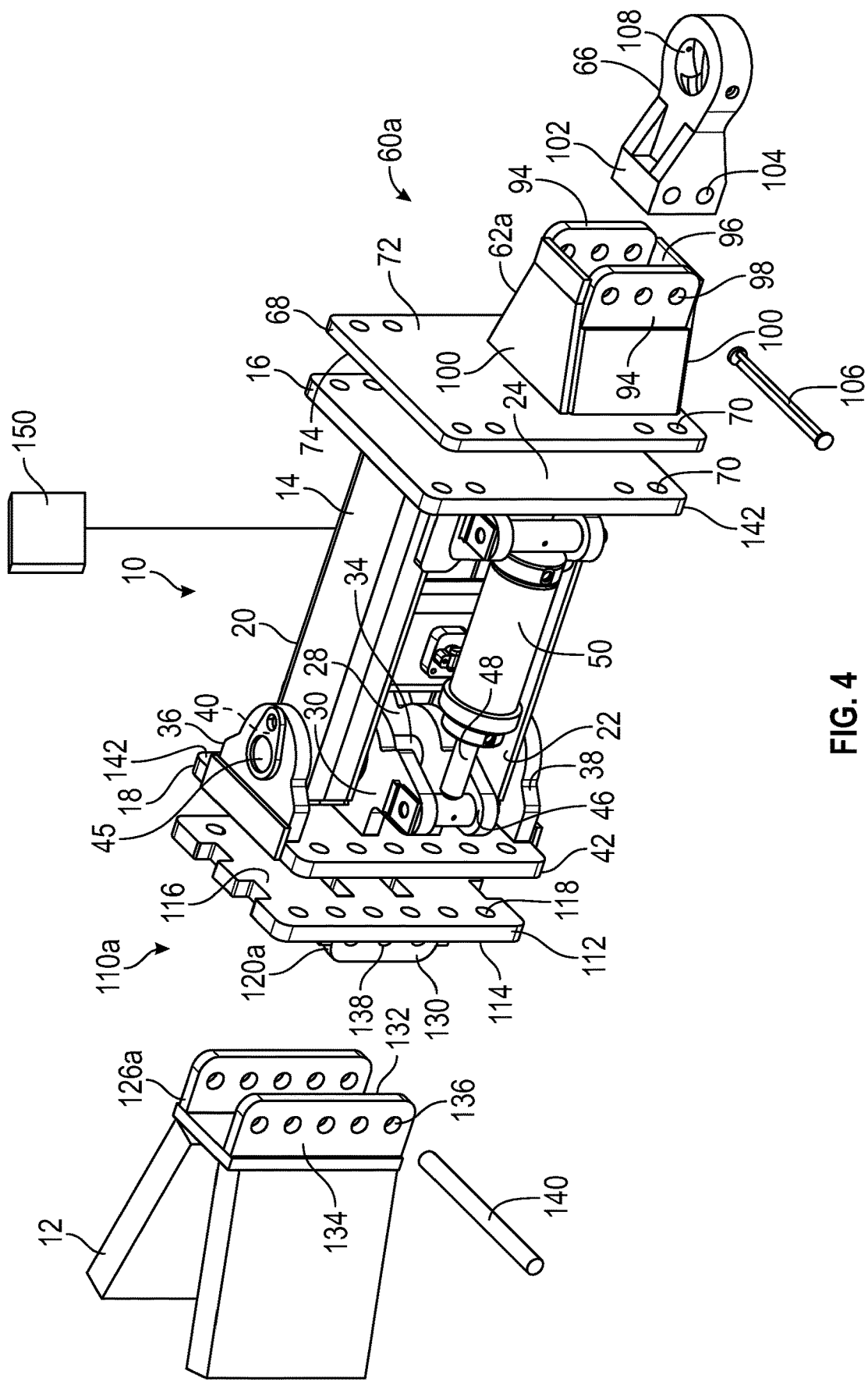
FIG. 4 is a top perspective view of the present implement guidance module configured for mounting to a drawbar hitch.

Referring now to FIGS. 1 and 4, a vehicle adapter, generally designated 60 is constructed and arranged for accommodating a desired hitch attachment 62 configured for connection to a vehicle connection point. In the preferred embodiment, the hitch attachment 62 is constructed and arranged for accommodating one of a two-point hitch 64 or a drawbar hitch 66. Thus, in use, the module 10 is contemplated as being provided with a two-point vehicle adapter 60 or a drawbar vehicle adapter 60a, depending on the hitch style favored by the user.

Referring now to FIGS. 1-3, the vehicle adapter 60 has a vehicle adapter plate 68 configured for mounting to the vehicle mounting plate 24. In the preferred embodiment, the vehicle adapter plate 68 and the vehicle mounting plate 24 have complementary mounting apertures 70 (FIG. 1) for facilitating releasable connection of the vehicle adapter plate to the vehicle mounting plate. It is also preferred that such attachment is releasable and is achieved through the use of threaded fasteners (not shown), such as nuts and bolts or the like.

The hitch attachment 62 is connected to the vehicle mounting plate 24 on a front surface 72 of the vehicle adapter plate 68 opposite a rear surface 74 forming the connection point to the module main frame 14. In the preferred embodiment, the hitch attachment 62 includes a weldment 76 having a pair of spaced, generally horizontal parallel plates 78 each having a throughbore 80 that defines a vertical pivot axis. Preferably, the plates 78 are connected to each other and to the front surface 72 of the vehicle adapter plate 68 by support plates 82. The weldment 76, having the aligned throughbores 80 is constructed and arranged for pivotally accommodating an implement mount 84 of the two-point hitch 64.

As is known in the art, the vehicle mount 84 has vertically spaced apertures 86 which are connectable to the throughbores 80 using a preferably vertically-oriented mounting pin 88 (FIG. 1). In the preferred embodiment, the vehicle mount 84 is configured so that plates 90 having the apertures 86 overlap the plates 78, however other orientations are contemplated. The main objective is that the two-point hitch 64 freely pivots relative to the vehicle adapter 60. As is well known in the art, the two-point hitch 64 also includes two laterally-spaced vehicle connection points 92.

Referring now to FIG. 4, the module 10 having the vehicle adapter 60*a* configured for use with the drawbar hitch 66 is depicted. Components shared with the vehicle adapter 60 are shown with identical reference numbers. A main distinctive structure of the vehicle adapter 60*a* is that a hitch attachment 62*a* has a pair of generally vertically-aligned, laterally spaced, parallel drawbar plates 94 which are secured to the front surface 72 of the vehicle adapter plate 68 so as to define a recess 96. Also, the plates 94 each have a plurality of vertically-spaced, horizontally extending hitch mounting holes 98. Support for the plates 94 is provided by upper and lower drawbar supports 100, which are secured to the vehicle adapter plate 68 and to the drawbar plates 94 as by welding or the like.

As is known in the art, the drawbar hitch 66 has a mounting end 102 also provided with generally horizontally projecting drawbar apertures 104 which are selectively aligned with the hitch mounting holes 98 using at least one transverse pin 106. The mounting end 102 is slidably engageable in the recess 96. Once the drawbar hitch 66 is connected to the vehicle adapter 60*a*, the combined adapter and hitch pivots relative to the vehicle about a vertical axis defined by a hitch eyelet 108.

Returning to FIGS. 1 and 4, opposite the vehicle adapter 60, 60*a*, the module 10 is also provided with an implement adapter 110, used with the vehicle adapter 60 for two-point hitches 64 (FIGS. 1-3), and 110*a*, used with the vehicle adapter 60*a* for drawbar hitches 66 (FIG. 4). The implement adapters 110, 110*a* are mounted on the module 10 and are used for connecting the module to the implement 12. Focusing on FIG. 4, included on the adapter 110*a* is an implement adapter plate 112 having a rear surface 114 facing the implement 12, and an opposite front surface 116 facing the implement mounting plate 42. As is the case with the vehicle mounting plate 24 and the vehicle adapter plate 68, the implement mounting plate 42 and the implement adapter plate 112 have a plurality of complementary mounting apertures 118 for facilitating releasable connection of the implement adapter plate to the implement mounting plate. Preferably, both the implement adapter plate 112 and the implement mounting plate 42 each have two spaced, parallel vertical rows complementary mounting apertures 118, such connection is releasable, and the fasteners (not shown) are preferably threaded fasteners and nuts, or the like.

Projecting rearwardly from the rear surface 114 of the implement is an implement attachment 120 preferably taking the form of a pair of generally horizontally oriented, vertically spaced implement attachment plates 122. Each of the implement attachment plates 122 has a complementary throughbore 124, so that the throughbores of the respective plates are in axial registry with each other and define a vertical pivot axis. The plates 122 are constructed and arranged so that they pivotally accommodate a hitch mount 126 of the implement 12. As is known in the art, the hitch mount 126 has a vertical throughbore 127, that is pivotally engaged with the implement attachment 120 through use of a connection pin 128 (FIG. 1). In the preferred embodiment, the plates 122 are configured to overlap the hitch mount 126, however other configurations are contemplated. Also, it is preferred that the vertical pivot axis defined by the connection pin 128 is parallel to the vertical pivot axis defined by the mounting pin 88. As described below relating to the stabilizer arms, the presence of the stabilizer arms prevents any pivoting action about the axis defined by the pivot pin 128.

Referring now to FIG. 4, implement adapter 110*a* is shown. Components shared with the implement adapter 110 are designated with identical reference numbers. In the implement adapter 110*a*, the implement attachment 120*a* takes the form of a single, vertically-oriented bar 130 attached to the rear surface 114 of the adapter plate 112, and dimensioned to slidably engage a slot 132 in the hitch mount 126*a*. The slot 132 is defined by a pair of parallel, preferably vertical hitch mount plates 134, each having a plurality of vertically-spaced, horizontally-projecting hitch mount apertures 136. On the vertically-oriented bar 130, a complementary plurality of implement adapter apertures 138 is used to connect the main frame 14 to the implement 12 using at least one connector pin 140. Upon connection, the implement 12 pivots with the implement mounting plate 42 relative to the main frame 14 of the module 10.

Another aspect of the vehicle mounting plate 24, the implement mounting plate 42, as well as the vehicle and implement adapter plates 68, 112, is that they have a relatively large surface area, such that a peripheral edge 142 of the plates 24, 42 extending at least one or vertically and horizontally beyond a periphery 144 of the main frame 14. This substantial size of the plates 24, 42 provides suitable strength at the same time providing a more convenient mounting arrangement of the respective vehicle and implement adapter plates 68, 112.

Referring again to FIGS. 1 and 4, the module 10 is preferably provided with a control system 150 which causes selective retraction and extension of the cylinders 50 for causing pivoting movement of the implement mounting plate 42, and consequential movement of the implement 12 relative to the main frame 14. As is known in the art, the control system 150 is preferably at least partially located on the vehicle, and especially preferably in a cab of the vehicle. Further, the control system 150 is contemplated as optionally employing a wireless communication system for receiving remote orienting signals, as through a GPS system or the like. In addition, the control system 150 is optionally controlled by a user located in the vehicle cab. It is further contemplated that the control system 150 includes suitable solenoids or other devices used to convert electronic signals to selective pressurization and depressurization of the fluid-power cylinders 50, using conventional fluid control valves or the like.

Referring again to FIGS. 1 and 3, another feature of the implement adapter 110 is a pair of stabilizer arms 160, each pivotally attached at one end 162 to aim mounts 164 fixed to the adapter 110. Opposite ends 166 preferably form a clevis mount. 168 configured for pivotal mounting to the implement 12 at implement mounts 170 using pivot pins 172. Preferably there are two stabilizer arms 160, which are provided for maintaining a vertical pivot axis between the implement 12 and the implement adapter plate 110 and preventing misalignment or skewing. Also, the arms 160 are configured for adjustability using a threaded rod 174 and a locknut 176 or the like along their longitudinal axis to accommodate various implements 12.

Figure 5:
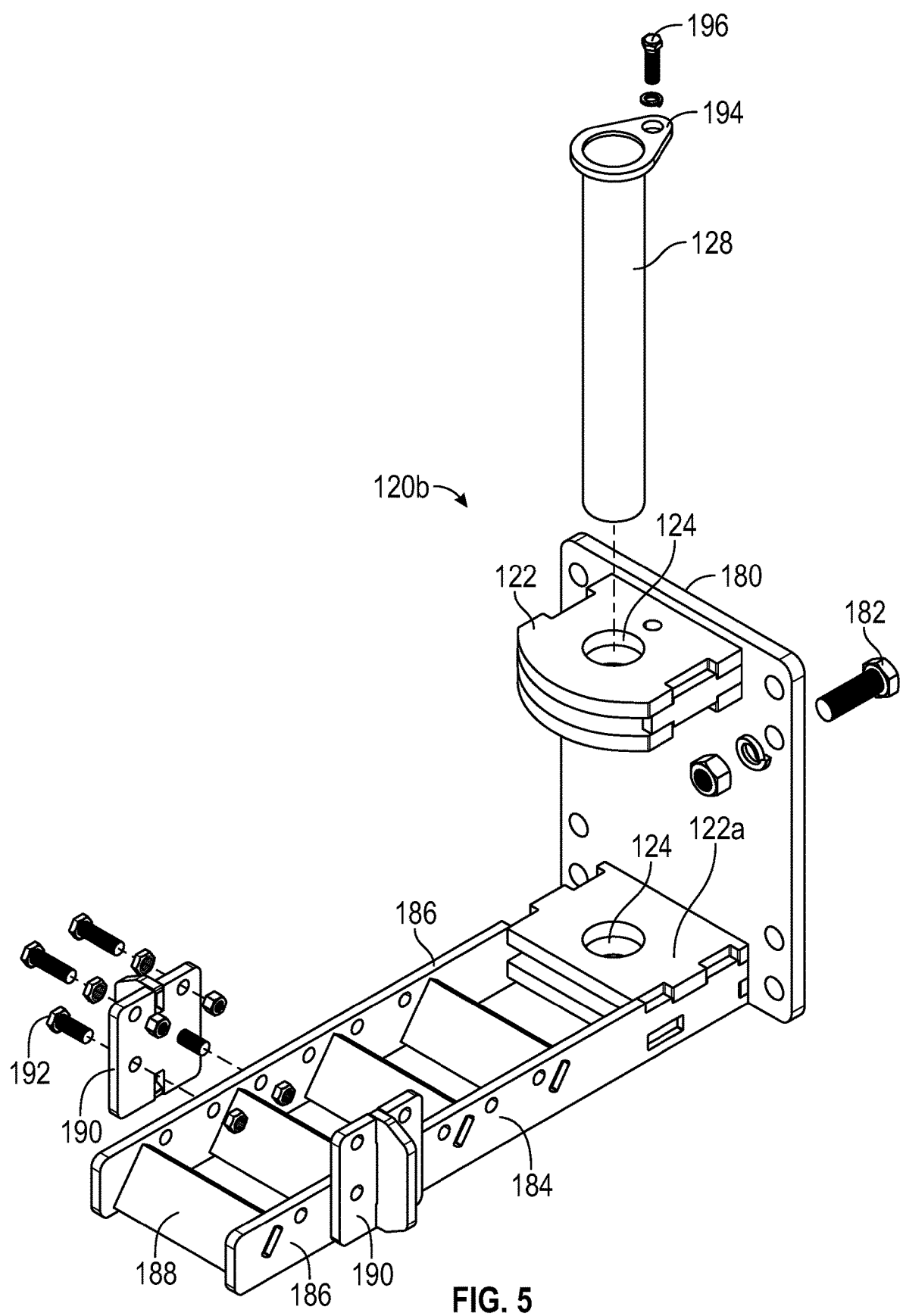
FIG. 5 is a top perspective view of an alternate embodiment of the implement attachment that is connected to the implement adapter plate.

Referring now to FIG. 5, an alternate embodiment to the implement attachments 120, 120*a* is generally designated 120*b*. Components shared with the attachments 120, 120*a* are designated with identical reference numbers. The implement attachment 120*b* differs from the counterparts 120, 120*a* in that it is designed to accommodate implements having distinguishable mounting hardware. Included on the implement attachment 120b is a base plate 180 secured, as through threaded fasteners 182 or the like to the implement mounting plate 42. Vertically spaced implement attachment plates 122, each having a throughbore 124 are secured, as by welding or the like, to the base plate 180. The plates 122 are arranged to slidingly receive the pivot pin 128.

A lower implement attachment plate 122a is constructed and arranged to accommodate an elongate tongue 184, which is configured to engage the implement (not shown), having a distinct mounting hardware compared to the implement 12 described above. While other configurations are contemplated, in the depicted embodiment, the tongue 184 is ladder-like, having a pair of elongate members 186 supported by transverse bars 188 joined to the elongate members by welding or the like to form a rigid structure. Implement mounting brackets 190 are secured to the tongue 184, via threaded fasteners 192 or the like, and also define the attachment points whereby the tongue is secured to the implement. As in the embodiments described above, once the implement is connected to the implement attachment 120b, free pivoting movement about the pin 128 is prevented. Any movement of the implement relative to the module main frame 14 is controlled by the fluid powered cylinders 50 under control of the control system 150 as described above.

As is the case with the pivot pin 45 and the other pins described above, the pivot pin 128 is optionally provided with a pivot pin mounting flange 194 which is securable to the respective attachment plate 122 or equivalent structure via fasteners 196.

While a particular embodiment of the present implement guidance module has been described herein, it will be appreciated by those skilled in the art that changes and modifications may be made thereto without departing from the invention in its broader aspects and as set forth in the following claims.

What is claimed is:

1. An implement guidance module for positioning a drawn implement as the implement is pulled by a vehicle traveling along a desired path of movement, the vehicle having a connection point for receiving a hitch, said module comprising:
   a module main frame having a first end configured for connection to the vehicle connection point, and a second end configured for connection to the implement, said main frame having a longitudinal axis;
   a pivot mount pivotably connected to said second end of said module main frame, said pivot mount including an implement mounting plate and pivoting relative to said module main frame about a pivot axis perpendicular to the longitudinal axis;
   a vehicle mounting plate defining said first end of said module main frame;
   said implement mounting plate defining said second end of said module main frame;
   a vehicle adapter constructed and arranged for accommodating a desired hitch mount configured for connection to the vehicle connection point, said vehicle adapter having a vehicle adapter plate configured for mounting to said vehicle mounting plate; and
   an implement adapter constructed and arranged for accommodating a connection to the implement and having an implement adapter plate configured for mounting to said implement mounting plate.

2. The implement guidance module of claim 1, further including at least one fluid powered cylinder connected at one end to said implement mounting plate, and to an opposite end to said module main frame so that reciprocal extension and retraction of said at least one cylinder causes said pivoting action of said implement mounting plate relative to said module main frame.

3. The implement guidance module of claim 2, further including a pair of said at least one fluid power cylinders, one each of said cylinders associated with one of a first and second sides of said module main frame.

4. The implement guidance module of claim 2, further including a control system enabling operator control of said pivoting implement mounting plate through action of said at least one fluid power cylinder.

5. The implement guidance module of claim 1, wherein said module main frame has a periphery, and said vehicle mounting plate and said implement mounting plate each have a peripheral edge extending vertically and horizontally beyond said periphery of said main frame.

6. The implement guidance module of claim 1, wherein said vehicle adapter plate and said vehicle mounting plate have complementary mounting apertures for facilitating releasable connection of said vehicle adapter plate to said vehicle mounting plate.

7. The implement guidance module of claim 1, wherein said implement adapter plate and said implement mounting plate have complementary mounting apertures for facilitating releasable connection of said implement adapter plate to said implement mounting plate.

8. The implement guidance module of claim 1, wherein said vehicle adapter includes a hitch attachment connected to said vehicle adapter plate on a surface of said plate opposite a connection point of said module main frame, said hitch attachment constructed and arranged for accommodating one of a drawbar hitch and a two-point hitch.

9. The implement guidance module of claim 1, wherein said vehicle adapter includes a hitch attachment connected to said vehicle adapter plate on a surface of said plate opposite a connection point of said module main frame, said hitch attachment including a pair of spaced, parallel plates defining a recess for accommodating a mounting end of a drawbar hitch, said parallel plates each having a plurality of vertically spaced hitch mounting holes, said mounting holes being oriented transversely to said longitudinal axis of said module main frame.

10. The implement guidance module of claim 1, wherein said vehicle adapter includes a hitch attachment connected to said vehicle adapter plate on a surface of said plate opposite a connection point of said module main frame, said hitch attachment including a weldment defining a vertical pivot axis, and constructed and arranged for pivotally accommodating an implement mount of a two-point hitch.

11. The implement guidance module of claim 10, wherein said vertical pivot axis is parallel to said pivot axis of said implement mounting plate.

12. The implement guidance module of claim 1, wherein said implement adapter includes an implement attachment connected to said implement adapter plate on a surface of said plate opposite a connection point of said module main frame, said implement attachment including a weldment defining a vertical pivot axis, and constructed and arranged for pivotally accommodating a hitch mount of an implement.

13. The implement guidance module of claim 12, wherein said implement adapter plate and said implement mounting plate each have two spaced, parallel vertical rows complementary mounting apertures for facilitating releasable connection of said implement adapter plate to said implement mounting plate.

14. The implement guidance module of claim 1, wherein said pivot mount includes upper and lower pivot brackets, said upper and lower pivot brackets each having bores, wherein said bores of said upper and lower pivot brackets are aligned with a bore in said module main frame and secured to said module main frame by a pin.

15. An implement guidance module for positioning a drawn implement as the implement is pulled by a vehicle traveling along a desired path of movement, the vehicle having a connection point for receiving a hitch, said module comprising:
- a module main frame having a first end configured for connection to the vehicle connection point, and a second end configured for connection to the implement, said main frame having a longitudinal axis;
- a pivot mount pivotably connected to said second end of said module main frame, said pivot mount including an implement mounting plate and pivoting relative to said module main frame about a pivot axis perpendicular to the longitudinal axis;
- a vehicle mounting plate defining said first end of said module main frame and configured for connection to a vehicle adapter which is connectable to a vehicle hitch; and
- said implement mounting plate defining said second end of said module main frame and configured for connection to an implement adapter which is connectable to an implement hitch mount.

16. The implement guidance module of claim 15, wherein said pivot mount includes upper and lower pivot brackets, said upper and lower pivot brackets each having bores, wherein said bores of said upper and lower pivot brackets are aligned with a bore in said module main frame and secured to said module main frame by a pin.

* * * * *